United States Patent [19]

Meyers

[11] Patent Number: 5,370,426
[45] Date of Patent: Dec. 6, 1994

[54] PIPE CONNECTOR FOR CONNECTING TO A HARD PLASTIC PIPE

[75] Inventor: Theodore W. Meyers, Inverness, Ill.

[73] Assignee: Tuf-Tite, Inc., Wauconda, Ill.

[21] Appl. No.: 222,903

[22] Filed: Apr. 5, 1994

Related U.S. Application Data

[62] Division of Ser. No. 913,140, Jul. 14, 1992, Pat. No. 5,336,351.

[51] Int. Cl.⁵ .............................................. F16L 21/08
[52] U.S. Cl. ................................... 285/237; 285/284; 285/328; 285/423; 285/915
[58] Field of Search .................. 285/21, 289, 290, 284, 285/915, 328, 423, 237

[56] References Cited

U.S. PATENT DOCUMENTS

| | | | |
|---|---|---|---|
| 2,825,587 | 3/1958 | Barta et al. | 285/284 |
| 2,876,154 | 3/1959 | Usab | 285/915 X |
| 4,013,309 | 3/1977 | Quick | 285/915 X |
| 4,256,333 | 3/1981 | Jones | 285/915 X |
| 4,511,163 | 4/1985 | Harris | 285/915 X |

FOREIGN PATENT DOCUMENTS 1288648 9/1972 United Kingdom ............... 285/328

Primary Examiner—Dave W. Arola
Attorney, Agent, or Firm—Tilton, Fallon, Lungmus & Chestnut

[57] ABSTRACT

A flexible pipe connector is disclosed for connecting to a hard plastic pipe. The flexible pipe connector, preferably made of polyethylene, has a tubing member which defines a cylindrical wall with inner and outer surfaces, the cylindrical wall having a male end which has a plurality of undercuts formed on the outer surface. The male end with the undercuts is inserted into the female end of a hard plastic pipe with a melting agent applied at the inner surface thereof. The melting agent melts the inner surface of the pipe's female end to form a liquified layer of hard plastic which is received in the male end's undercuts and then hardens into a reconfigured solid layer. In this manner, the flexible pipe connector, which is inert and normally cannot be attached with glue to a hard plastic pipe, can be sealably secured to a hard plastic pipe as the liquified layer solidifies within the undercuts to prevent separation of the pipe connector and the hard plastic pipe and to provide a seal therebetween.

20 Claims, 2 Drawing Sheets 5,370,426

PIPE CONNECTOR FOR CONNECTING TO A HARD PLASTIC PIPE

This application is a divisional of U.S. patent application No. 913,140 filed on July 14, 1992, now Pat. No. 5,336,351 issued Aug. 9, 1994.

FIELD OF THE INVENTION

This invention relates to a flexible pipe connector of an inert polymer which can be connected to a hard plastic pipe by virtue of a series of undercuts formed on the flexible pipe connector to receive liquified hard plastic when a solvent weld glue is applied to the hard plastic pipe.

Background of the Invention

In the construction industry, PVC pipe and corrugated plastic pipe are widely used for construction of drain tiles. installation of septic systems and many other commercial and residential purposes. Corrugated plastic pipe is known as being inexpensive and a reliable material while PVC pipe is a standard in the industry although not quite as economical. Although corrugated plastic pipe is relatively inexpensive, couplings to connect lengths of corrugated pipe are relatively expensive and can create an expense far in excess of the cost of the corrugated pipe itself. In an application soon to be filed, 17 entitled "Flexible Pipe Connector" the present inventor discloses a female-to-female flexible pipe connector for connecting lengths of corrugated pipe. The flexible pipe connector is made of an inert polymer, such as linear low density polyethylene, which is flexible and stretchable in nature so that a length of corrugated pipe received in a female end stretches the female end so as to produce radially inward compressive forces on a corrugated pipe or smooth-walled pipe, effectuating a gravity flow water-tight seal between the connector and the pipe. The referenced application also discloses a male-to-female flexible pipe connector wherein the female end receives the corrugated pipe in the same manner but the male end is adapted to be inserted into a flexible seal member of a septic drop box.

As methods of connecting corrugated pipe to pipe components made of PVC are relatively unknown in the art, it would be desirable to be able to connect the male end of the flexible pipe connector to a pipe component comprised of PVC. However, polyethylene, and more generally, inert polymers, are chemically inert and are not practical for using with the typical solvent weld glues which are used to connect PVC pipe to PVC components. Therefore, the problem to be solved by the present invention is to construct a flexible pipe connector which may be used to sealably connect PVC components and a method for accomplishing this end.

Summary of the Invention

The present invention addresses the above problems by providing a flexible pipe connector which comprises a tubing member made of polyethylene, preferably linear low density polyethylene, and having a cylindrical wall with inner and outer surfaces, said cylindrical wall defining a male end which has a plurality of receiving means formed on the outer surface thereof. The receiving means is adapted to receive liquified hard plastic from a hard plastic pipe within which the male end is to be inserted when a suitable melting agent, e.g., solvent weld glue, is applied between the outer surface of a male end and an inner surface of a female end of the hard plastic pipe. In this manner, the melting agent melts an inner layer of the female end to form a liquified layer of plastic which flows into the receiving means of the connector male end and then hardens. This acts to sealably secure the male end of a polyethylene flexible pipe connector into the female end of the hard plastic pipe or pipe fitting.

Thus, it is a primary object of the present invention to provide a flexible pipe connector made of an inert polymer which can be connected at one end to a length of corrugated pipe or smooth-walled pipe and at another end to a hard plastic pipe or pipe fitting, such as made of PVC.

It is another object of the present invention to provide a method for connecting a polyethylene pipe connector to a pipe or pipe component made of hard plastic.

It is another object of the present invention to provide a flexible pipe connector which has a female end for sealably receiving a length of hard plastic pipe.

The means by which the foregoing and other objects of the present invention are accomplished and the manner of their accomplishment will be readily understood from the following specification upon reference to the accompanying drawings, in which.

DESCRIPTION OF THE PREFERRED EMBODIMENT

Figure 1:
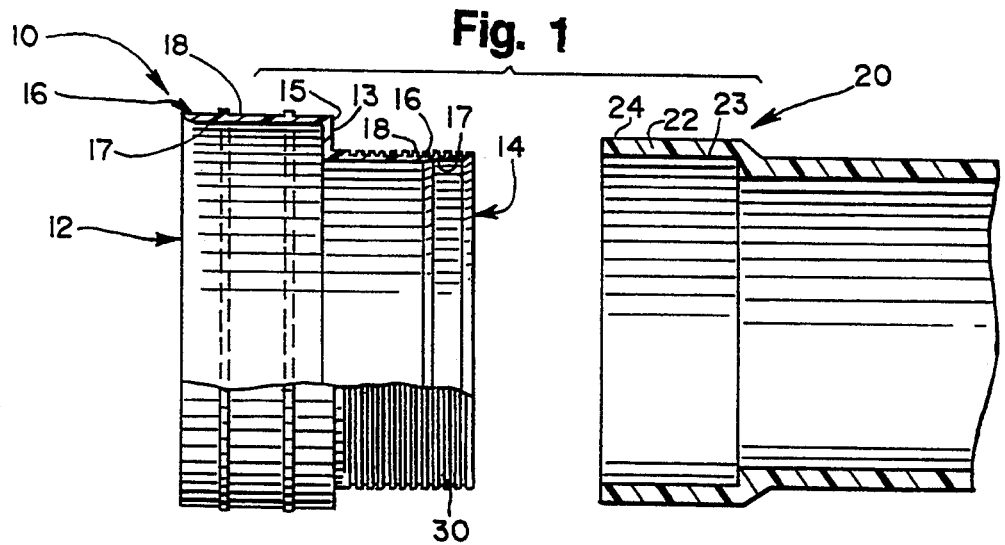
FIG. 1 is an exploded side view, shown in partial cross section, of a flexible pipe connector with a male end and a hard plastic pipe with a female end.

Having reference to the drawings, wherein like reference numerals indicate corresponding elements, there is shown in FIG. 1 an illustration of the flexible pipe connector 10 of a preferred embodiment and a female end 20 of a hard plastic pipe component. The flexible pipe connector 10 has a female end 12 and a male end 14. Both the male end 14 and the female end 12 are defined by a cylindrical wall 16, having an inner surface 17 and an outer surface 18. An annular wall 13, which is perpendicular to a longitudinal axis of the cylindrical wall 16, is connected at one end 15 to the cylindrical wall 16 of the female end 12, and connected at an another opposite end to the cylindrical wall 16 of the male end 14.

The entire flexible pipe connector 10 is preferably made of linear low density polyethylene, however, it can be made of polyethylene or any other inert polymer having the necessary properties of toughness, flexibility and stretchability needed for the female end 12 to engage a length of corrugated pipe. When a length of corrugated pipe is inserted into the female end 12, the cylindrical wall 16 stretches radially outward so as to exert radially inward compressive forces against the corrugated pipe forming a gravity flow fluid-tight seal. Additionally, if desired to increase the sealing effect, a clamping means, such as a radiator clamp, (not shown) can be placed about an outer periphery of the female end 12 so as to effectuate a pressure flow water-tight seal about the length of corrugated pipe or smooth-walled pipe inserted into the connector's female end 12. (For a more detailed description of the operation of the female end of the flexible pipe connector 10, reference may be had to my soon-to-be-filed application entitled "Flexible Pipe Connector".)

The female end 20 of the hard plastic pipe component (not shown) has a pipe wall 22 with an exterior surface 24 and an interior surface 23. Hard plastic pipe components with such a female end 20 are well known and are sold in many standard sizes and shapes, such as a "T" or "Y" connective component. Typically, the pipe wall 22 is 0.20 inches thick and is made of a hard plastic material, such as polyvinylchloride typically known in the industry as PVC pipe, or of so-called ABS plastic, or of styrene plastic. Although the invention is shown as working well with PVC pipe, the flexible pipe connector of the present invention can be used with any hard plastic pipe or pipe component which can be chemically attached. It will be understood that the corresponding pipe wall thickness for a hard plastic pipe is commonly somewhat thicker, i.e., 0.25 inches, such found in so-called Schedule 40 PVC pipe.

Figure 2:
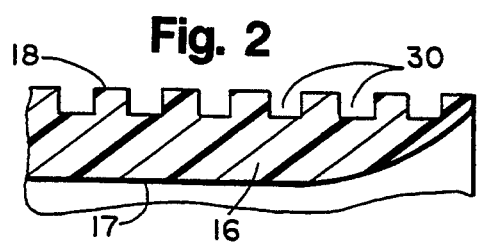
FIG. 2 is an enlarged cross section of the cylindrical wall of the male end of a flexible pipe connector.

As shown in FIG. 2, the cylindrical wall 16 of the male end 14 has a plurality of concentric grooves 30 on the outer surface 18. These concentric grooves 30 act as a receiving means for receiving a liquified layer 40 of hard plastic pipe component when a melting agent is applied to a surface of the hard plastic pipe component so as to soften and melt the same. When used with the present invention, the mating surface of the hard plastic pipe has three states: an original solid state; a liquified state when a melting agent is applied to the hard plastic; and a solid state once the hard plastic in the liquified state cures.

The cylindrical wall 16 of the male end 14, when it is to be used with a typical 4" PVC pipe component, is preferably about 0.070" thick. The concentric grooves 30 preferably have a depth of about 0.010" for receiving the liquified hard layer 40 of hard plastic. Although in this embodiment the specific dimensions of the cylindrical wall 16 are given, these dimensions are not absolute and will be varied depending upon the size of the hard plastic pipe or pipe component that the flexible pipe connector 10 is to be attached to. One having skill in the art can ascertain the relative specific dimensions of the cylindrical wall 16 in relation to the dimensions of the hard plastic pipe or component.

Figure 3:
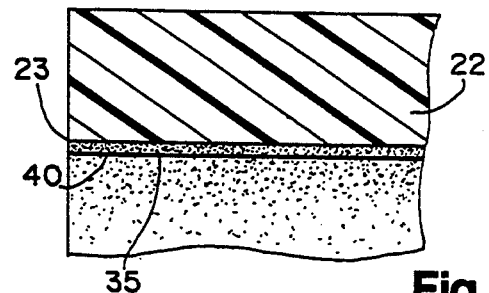
FIG. 3 is an enlarged cross section of the pipe wall of the female end of the hard plastic pipe shown after a melting agent has been applied to its inner surface.
Figure 5:
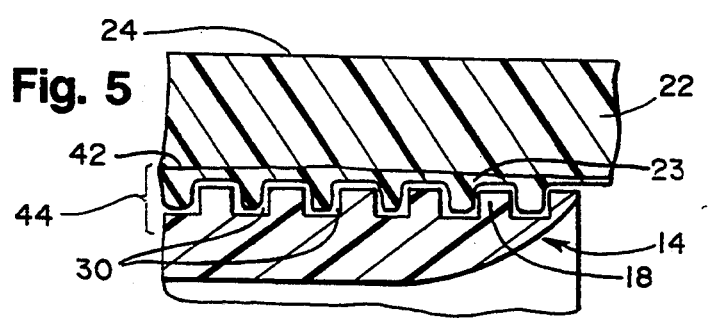
FIG. 5 is an enlarged cross sectional view of the cylindrical wall of the flexible pipe connector and the pipe wall of the hard plastic pipe.

FIG. 3 illustrates the pipe wall 22 of the female end 20 of the hard plastic pipe component after a melting agent 35 has been applied to the interior surface 23 of the female end 20 so as to form a liquified, i.e., melted, layer 40. The melting agent 35 can be any solvent weld glue known in the art and commonly used, such as plumber's solvent weld glue, for example. Typically, the melting agent 35 will attack, i.e., soften, the first 0.005" to 010" of the interior surface 23 to which it is applied. Although curing times will vary, the melting agent 35 should be selected so that the interior surface 23 will form a liquified layer 40 for a sufficient period of time for the male end 14 to be inserted into the female end 20. Thereafter, the liquified layer 40 will resolidify in a relatively short period of time in order to form a reconfigured solid layer 42 as shown in FIG. 5, i.e., it will now be shaped to correspond to whatever configuration of undercut or protruding receiving means are formed on the mating connector surface.

Figure 4:
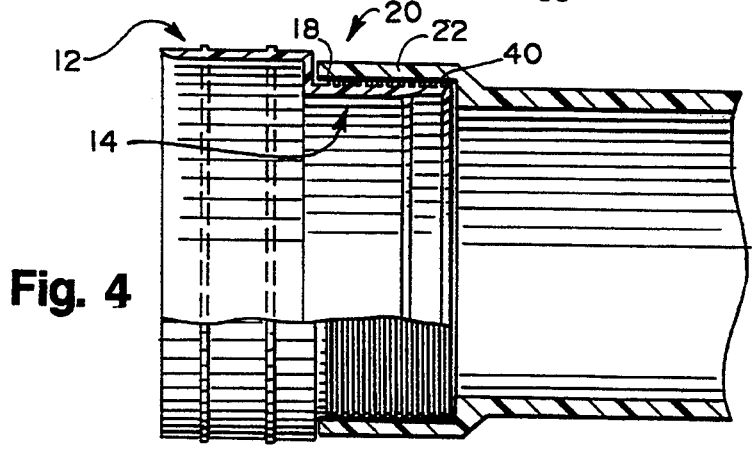
FIG. 4 is an enlarged side view shown in partial cross section of the flexible pipe connector with the male end inserted into the female end of a hard plastic pipe.

The male end 14 of the flexible pipe connector 10 is shown inserted into the female end 20 in FIG. 4. FIG. 5 is an enlarged cross sectional view of the interface 44 of the connector male end 14 and hard plastic pipe female end 20, the latter sometimes being called a "bell" end. As shown in FIG. 5, once the connector male end 14 is inserted into the pipe female end 20, the liquified layer 40 resolidifies into the solid layer 42 but only after molten pipe material has flowed into the concentric grooves 30 of the male end 14. This resolidified layer 42 engages the plurality of concentric grooves 30 so as to prevent the male and female ends 14 and 20 from moving relative to one another along their common longitudinal axis, i.e., from being pulled apart. The interface 44 of the solid layer 42 and the concentric grooves 30 also prevents fluids from entering the interface 44, i.e., a watertight seal is created therebetween. In this manner, the receiving means of the male end 14 are now lockably engaged with the solid layer 42 of the pipe's female end 20 so that the flexible pipe connector 10 and the pipe 21' are sealably secured together.

Figure 6:
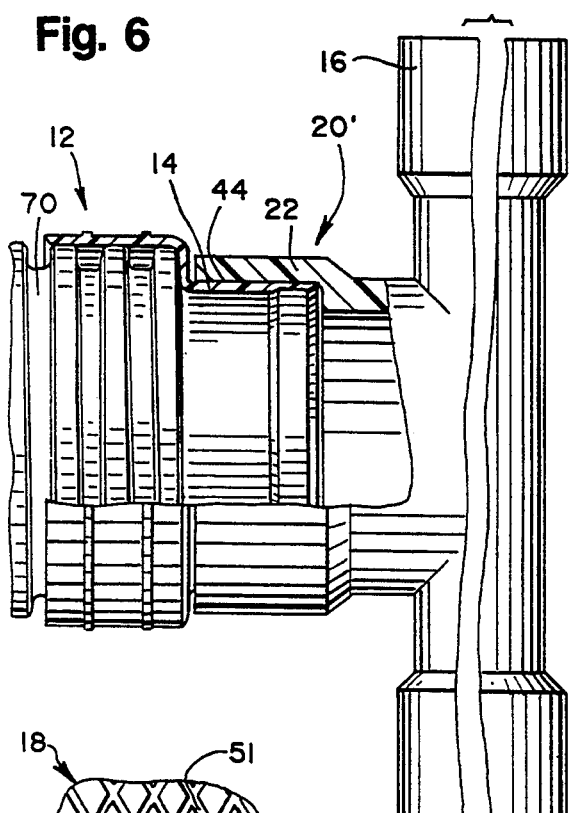
FIG. 6 is a partially cutaway side view shown in partial of the flexible pipe connector with a length of corrugated pipe inserted into the female end and the male end inserted into the female end of a hard plastic pipe component.

A typical use of the present invention, shown in its entirety, is illustrated in FIG. 6 where the male end 14 of the flexible pipe connector 10 is inserted into the female end 20' of a hard plastic pipe component 60, the latter here in the shape of a "T" member with bell ends. Although this embodiment shows the hard plastic pipe component as a "T" connector, the flexible pipe connector 10 can be used with any hard plastic pipe or pipe component having a female end, such as a 45°, elbow, or "Y" member, for example. A length of corrugated pipe 70 is inserted into the female end 12 of the flexible pipe connector 10 forming a gravity flow fluid-tight seal between the corrugated pipe 70 and the flexible pipe connector 10, all as further described in my soon-to-be filed application entitled "Flexible Pipe Connector". Since the male end 14 of flexible pipe connector 10 has receiving means formed on the outer surface 18 thereof, the use of a melting agent 35 between the T-component female end 20″ and the male end 14 creates an interlocking interface 44 between such parts which acts to prevent their separation and provides a sealably secure interconnection.

Figure 7:
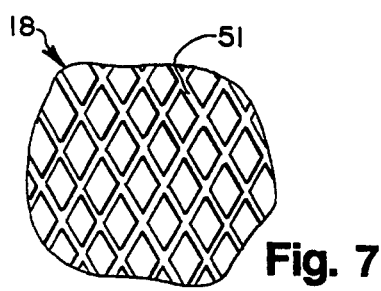
FIG. 7 shows a portion of the outer surface of a male end having one pattern of undercut receiving means.

FIG. 7 illustrates an alternative embodiment of the receiving means disposed on the male end's outer surface 18 in the form of a plurality of diagonal grooves 51, receptive sets of which are oppositely angularly orientated to each other.

Figure 8:
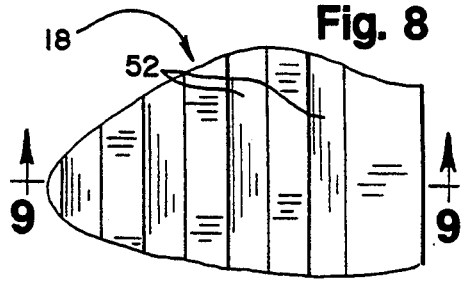
FIG. 8 shows a portion of the outer surface of the male end with another pattern of undercut receiving means.
Figure 9:
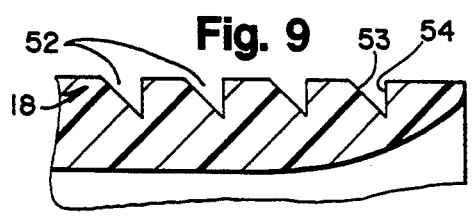
FIG. 9 is an enlarged cross sectional view of the male end of FIG. 8, taken along line 9—9, and showing the undercuts.

Another alternative embodiment of the receiving means is illustrated in FIG. 8 which shows a pattern of undercuts 52 disposed on the outer surface 18 of the male end 14. These undercuts 52 are further illustrated in FIG. 9 which shows an enlarged cross sectional view taken at line 9—9. The undercuts 52 are formed so as to have a slanted cut 53 and a vertical wall 54. When the connector male end 14, as formed with such undercuts 52, is inserted into the pipe component female end 20′, the liquified layer 40 flows into the undercuts 52 until it forms a solid layer 42 (see FIG. 5). Once such a reconfigured solid layer 42 is formed, the solid layer 42 acts against the vertical wall segments 54 (of the undercuts 52) so as to prevent longitudinal movement of the male end 14 inside of the female end 20′. It should be noted that these undercuts can be placed in a pattern such as shown in FIG. 8 or may be randomly disposed about the outer surface 18 of the male end 14 of the flexible pipe connector 10. The undercuts 52 may also be disposed in a diagonal pattern such as diagonal grooves 51 (FIG. 7) or any other pattern or shape to create the required receiving means on the flexible connector. That is, any of these patterns of undercuts 52 forms an undercut means for receiving the liquified layer of hard plastic.

Figure 10:
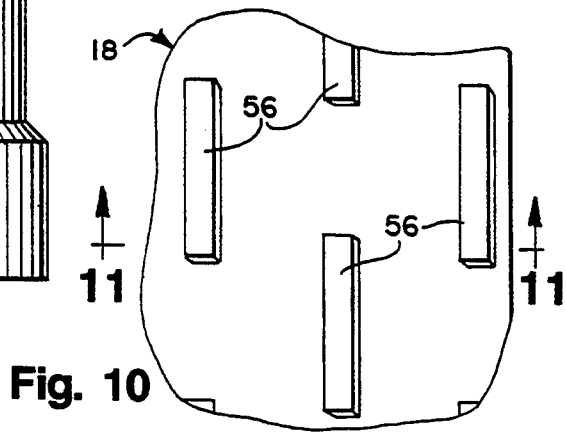
FIG. 10 shows a portion of the outer surface of the male end having a plurality of raised protrusions extending therefrom.
Figure 11:
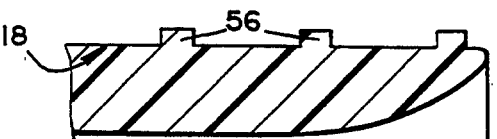
FIG. 11 is an enlarged cross sectional view of the male end of FIG. 10, taken along line 11—11, and illustrating the protrusions.

FIG. 10 illustrates another alternative embodiment of the present invention in the form of a plurality of spaced protrusions 56 extending radially outward from the outer surface 18). These protrusions 56 are further illustrated in an enlarged cross sectional enlarged view in FIG. 11. When the male end 14 is inserted into the female end 20, these protrusions 56 extend into the liquified layer 40. When the liquified layer 40 resolidifies into solid layer 42, the protrusions 56 will be embedded in the solid layer 42 so as to prevent longitudinal movement of either the connector male end or the pipe female end thereby sealably securing such parts together.

The undercuts 51, 52 or the raised protrusions 56 are preferably molded onto the male end 14 during manufacture of the flexible connector 10, such as part of an injecting molding process. However, they may be formed by various other processes, such as cut onto the outer surface 18 of the male end 14, such as by using a lathe, file, or other cutting device, for example.

Figure 12:
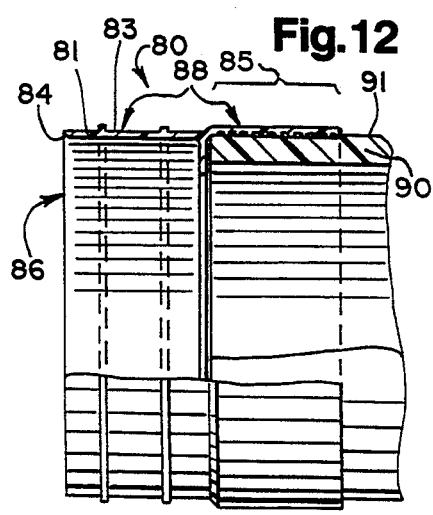
FIG. 12 shows a female-to-female flexible pipe connector having a length of hard plastic pipe inserted into a female end thereof.

In the above embodiments, the invention has been shown with receiving means disposed upon the outer surface 18 of the male end 14. However, the invention is equally useful when the receiving means are placed upon the interior of a connector female end 80 (see FIG. 12). There, a female-to-female flexible pipe connector 80 is shown for interconnecting lengths of hard plastic pipe 90. The female-to-female connector 80 has two female ends 88, each female end 88 having a receiving length 85 and being defined by a cylindrical wall 81 with inner and outer surfaces 84 and 83. The hard plastic pipe 90 is inserted into a mouth 86 of the female end 88 so that the tube wall 81 stretches radially outward causing radially inward compressive forces against an outer wall 91 of the hard plastic pipe 90. (That female-to-female flexible pipe connector 80 is essentially the same form of flexible pipe connector as disclosed in my soon-to-be-filed application entitled "Flexible Pipe Connector". However, the receiving means of the present invention can be advantageously used in conjunction with a female-to-female connector so as to allow the connector to be used in sealably connecting lengths of straight hard plastic pipe, e.g., PVC pipe, including odd lengths thereof not including any enlarged or "bell" ends.

Figure 13:
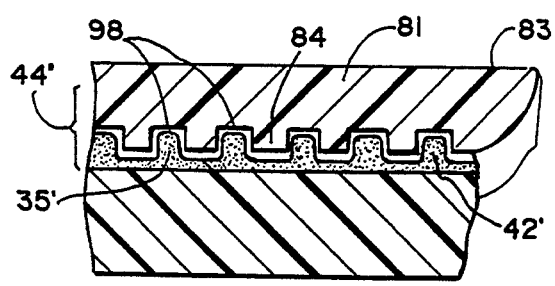
FIG. 13 is an enlarged cross sectional view of the interface between the cylindrical wall of the flexible pipe connector and the pipe wall of FIG. 12.

FIG. 13 illustrates this use of the invention and shows a length of hard plastic pipe 90 inserted into the connector female end 88. In this enlarged cross sectional view, the outer surface 91 is exposed to a melting agent 35 so as to form a liquified layer 40 in the same manner as earlier described. The liquified layer 40 hardens into a reconfigured solid layer 42 at the interface 44′ between the inner surface 84 of the connector female end 88 and the outer surface 91 of the hard plastic pipe 90. Again, the inner surface 84 of the female end 88 has formed thereon a receiving means, shown in FIG. 13 as a plurality of concentric grooves 98, for engaging the resolidified layer 42 at the interface 44. In this manner, solid layer 42 engages the concentric grooves 98 so as to sealably secure the hard plastic pipe 90 within and to the connector female end 88. Although the female-to-female connector 80 is shown with its receiving means in the form of a plurality of concentric grooves 98, the receiving means may also be comprised of any of the embodiments earlier discussed, or any other variations thereof which would occur to those skilled in the art.

From the foregoing, it is believed that those skilled in the art will readily appreciate the unique features and advantages of the present invention over previous types of interconnections between corrugated pipe, hard plastic pipe, and hard plastic fittings therefor. Further, it is to be understood that while the present invention has been described in relation to a particular preferred and alternate embodiments as set forth in the accompanying drawings and as above described, the same nevertheless are susceptible to change, variations and substitution of equivalents without departure from the spirit and scope of this invention. It is therefore intended that the present invention be unrestricted by the foregoing description and drawings, except as may appear in the following appended claims.

We claim:

1. A pipe joint comprising:

a flexible pipe connector including a tube member composed of an inert polymer and having a cylindrical wall with inner and outer surfaces, said tube member including a male end, said tube member further including receiving means formed on said outer surface of said male end for receiving and engaging a liquified layer of hard plastic;

a second pipe component composed of hard plastic and having a cylindrical wall with inner and outer surfaces, said pipe component including a female end;

said male end of said tube member being inserted into said female end of said second pipe component, said female end including on said inner surface a reconfigured solid layer that is at least partially received in said receiving means of said male end to create a secure interlock between said male end and said female end, said reconfigured solid layer being formed from applying a solvent weld glue to said inner surface of said female end to create a liquified layer that hardens into said reconfigured solid layer.

2. The invention of claim 1 wherein said flexible pipe connector is made of polyethylene.

3. The invention of claim 1 wherein said flexible pipe connector is made of linear low density polyethylene.

4. The invention of claim 1 wherein said hard plastic comprises polyvinyl chloride.

5. The invention of claim 1 wherein said receiving means comprises a plurality of undercuts each having a slanted wall and a vertical wall, said vertical wall being adapted to engage said liquified layer of said hard plastic when the liquified layer hardens into a solid layer, thereby preventing relative longitudinal movement of said connector and said hard plastic pipe component.

6. The invention of claim 1 wherein said receiving means comprises a plurality of concentric grooves formed substantially perpendicular to a longitudinal axis of said tube member.

7. The invention of claim 1 wherein said receiving means comprises a first plurality of grooves aligned diagonal to a longitudinal axis of said tube member and a second plurality of grooves formed at an angle to said diagonal of said first plurality of grooves.

8. The invention of claim 1 wherein said receiving means comprises a plurality of undercuts randomly disposed along said outer surface of said male end.

9. A pipe joint comprising:
a flexible pipe connector including a tube member composed of an inert polymer and having a cylindrical wall with inner and outer surfaces, said tube member including a female end, said tube member further including receiving means formed on said inner surface of said female end for receiving and engaging a liquified layer of hard plastic;
a second pipe component composed of hard plastic and having a cylindrical wall with inner and outer surfaces, said pipe component including a male end;
said male end of said second pipe component being inserted into said female end of said tube member, said male end including on said outer surface a reconfigured solid layer that is at least partially received in said receiving means of said female end to create a secure interlock between said male end and said female end, said reconfigured solid layer being formed from applying a solvent weld glue to said outer surface of said male end to create a liquified layer that hardens into said reconfigured solid layer.

10. The invention of claim 9 wherein said flexible pipe connector is made of polyethylene.

11. The invention of claim 9 wherein said flexible pipe connector is made of linear low density polyethylene.

12. The invention of claim 9 wherein said hard plastic comprises polyvinyl chloride.

13. The invention of claim 9 wherein said receiving means comprises a plurality of undercuts each having a slanted wall and a vertical wall, said vertical wall being adapted to engage said liquified layer of said hard plastic when the liquified layer hardens into a solid layer, thereby preventing relative longitudinal movement of said connector and said hard plastic pipe component.

14. The invention of claim 9 wherein said receiving means comprises a plurality of concentric grooves formed substantially perpendicular to a longitudinal axis of said tube member.

15. The invention of claim 9 wherein said receiving means comprises a first plurality of grooves aligned diagonal to a longitudinal axis of said tube member and a second plurality of grooves formed at an angle to said diagonal of said first plurality of grooves.

16. The invention of claim 9 wherein said receiving means comprises a plurality of undercuts randomly disposed along said outer surface of said male end.

17. A flexible and stretchable pipe connector for sealably connecting a first pipe end to a length of hard plastic pipe, said connector comprising:
a flexible and stretchable tube member composed of an inert polymer;
said tube member defining at one end a female end having a receiving length with a mouth at a first end and a stop means at a second end, said mouth being adapted to slidably receive a pipe end; wherein said receiving length is capable of stretching sufficiently radially outward and exerting sufficient radially inward compressive forces to create a water-tight seal when a pipe end is inserted into said receiving length;
said tube member defining at the other end a male end having inner and outer surfaces; said male end being provided on its outer surface with receiving means for receiving and engaging a liquified layer of hard plastic when said male end is inserted into a female end of a hard plastic pipe and a solvent weld glue is interposed between said female end and said male end, said receiving means also being provided for creating an interlocking engagement with said liquified layer when said liquified layer hardens into a reconfigured solid layer in said receiving means.

18. The invention of claim 17 wherein said tube member is composed of linear low density polyethylene.

19. The invention of claim 17 wherein said female end of said tube member has an inner surface and said inner surface includes receiving means for receiving and engaging a liquified layer of hard plastic when a hard plastic pipe end is inserted into said female end and a solvent weld glue is interposed between said hard plastic pipe and said female end, said receiving means being further provided for creating a secure interlock with said liquified layer when said liquified layer hardens into a reconfigured solid layer in said receiving means.

20. The invention of claim 17 wherein said receiving means comprises a plurality of undercuts each having a slanted wall and a vertical wall, said vertical wall being adapted to engage said liquified layer of said hard plastic when the liquified layer hardens into a solid layer, thereby preventing relative longitudinal movement of said connector and said hard plastic pipe component.

* * * * *